Patented May 23, 1950

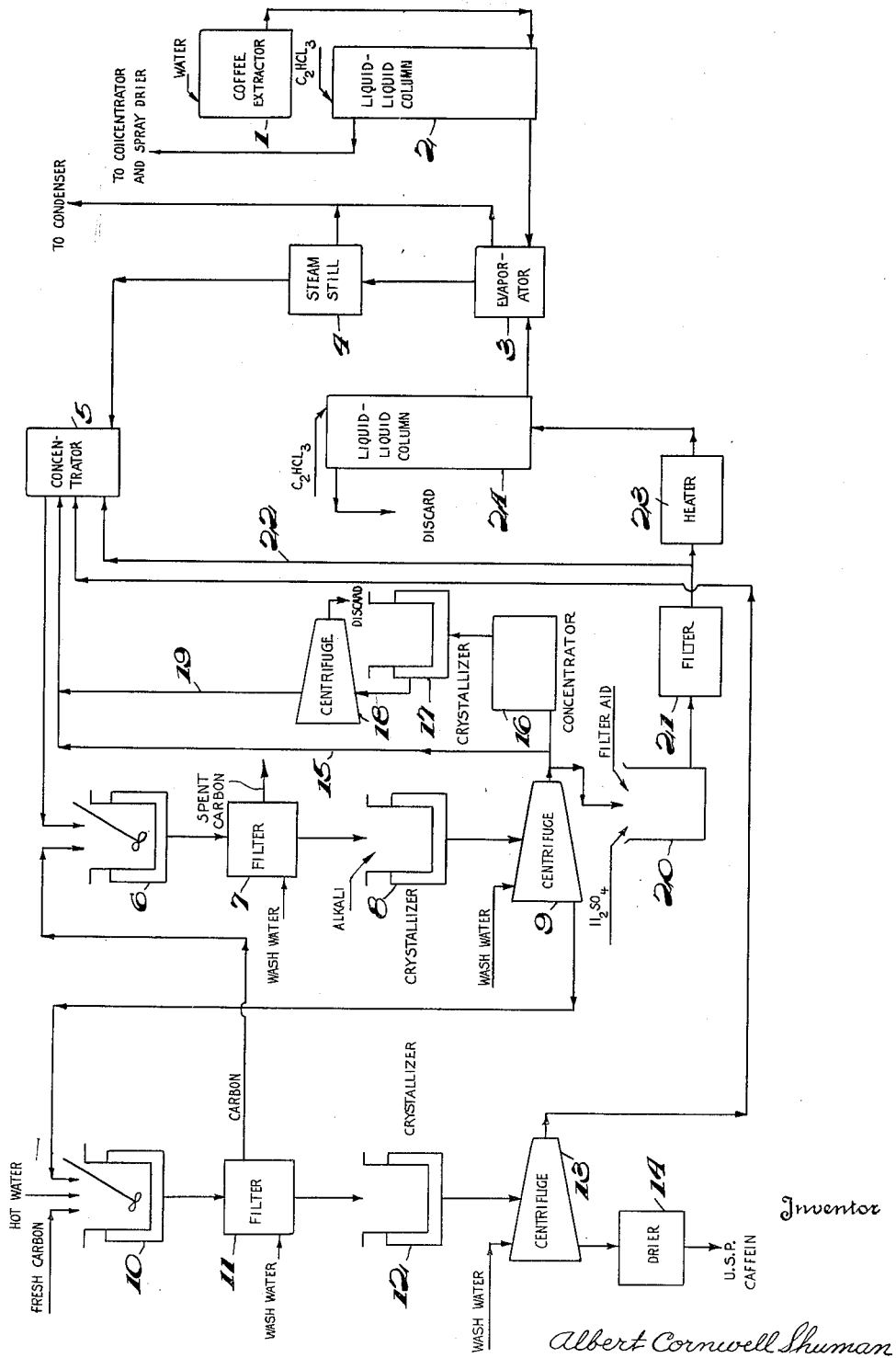

2,508,545

UNITED STATES PATENT OFFICE 2,508,545

PROCESS OF RECOVERING CAFFEIN

Albert C. Shuman, Rutherford, N. J., assignor to General Foods Corporation, New York, N. Y., a corporation of Delaware Application July 20, 1948, Serial No. 39,655

9 Claims. (Cl. 260—256)

1

The present invention relates to the recovery of caffein from aqueous coffee extracts and more particularly to the crystallization therefrom of caffein substantially uncontaminated with other water soluble coffee constituents present in such extracts.

In decaffeinating coffee intended for use as a beverage, it is desirable to remove the caffein without removing or affecting adversely those other constituents of the coffee that provide its characteristic flavor and aroma. These desirable constituents are for the most part water-soluble, and the selective extraction or separation of the caffein from the bulk of such water-soluble constituents is usually effected by the use of water-immiscible, organic caffein solvents such as benzene, toluene, hexane, trichlorethylene, carbon tetrachloride, perchlorethylene, methylene chloride, ethylene dichloride and the like. The caffein can then be recovered by separating it from the organic solvent solution and dissolving it in water, as by distilling off the solvent or by liquid-liquid extraction, and eventually crystallized from its aqueous solution.

For a long time it was the established practice to extract the coffee directly with the organic solvent, in spite of recognized and serious disadvantages of this procedure. The direct contact of the solvent with the coffee removed coffee waxes and oils along with caffein and also produced adverse effects on remaining constituents of the coffee with consequent deterioration of flavor and aroma of the coffee beverage. On the other hand the presence of the coffee oils and waxes in the caffein solution made it difficult to obtain caffein of a high degree of purity even after repeated treatments with carbon and recrystallization.

It is also possible to extract caffein from coffee by means of water, thus avoiding direct contact of an organic solvent with the coffee, but this method of decaffeination was seldom used because many other desirable water-soluble constituents of the coffee were extracted at the same time, with consequent objectionable deterioration in the flavor and aroma of the remaining coffee for beverage purposes. In recent years, however, the method of U. S. Patent No. 2,309,092 was developed in which such losses are prevented by continuously recycling the aqueous extract through the coffee and through a liquid-liquid extraction with a water-immiscible, organic caffein solvent such as those mentioned above. Thus caffein is removed from the aqueous solution by the organic solvent, but the concentrations of other water-soluble coffee constituents in the aqueous solution build up until such other constituents are no longer extracted from the coffee. This method provides decaffeinated coffee of superior flavor and aroma for beverage purposes, and also results in an organic solvent solution of caffein which can be further treated as described above to recover the caffein therefrom.

An organic solvent caffein solution of similar characteristics is obtained in the manufacture of "instant" or soluble decaffeinated coffee as described in the copending application of Norton E. Berry, Serial No. 676,476, filed June 13, 1946. In this process an aqueous infusion of roasted coffee is liquid-liquid extracted with a water-immiscible organic caffein solvent, after which the decaffeinated infusion is suitably concentrated and dried.

Such organic solvent solutions of caffein, obtained by aqueous extraction of the coffee followed by liquid-liquid extraction of the aqueous solution by the organic solvent, are wax-free since the coffee waxes and oils are not appreciably soluble in water and hence are not extracted from the coffee to a material extent. Hence the caffein can be re-dissolved in water and then crystallized from such aqueous solution without the complications which arise in the case of solvent extraction of the coffee due to the presence of waxes and oils. On the other hand, aqueous coffee extracts do contain certain other non-caffein impurities which have solubility characteristics so similar to those of caffein that they are extracted from the coffee with the caffein and follow it into the organic solvent solution and thence into the final aqueous solution from which the caffein is crystallized. On crystallization, these impurities result in the formation of dark-colored, coarsely granular crystals instead of the desired white, needle-shaped crystals of pure caffein. Such impure crystals must be purified by further processing to render them of acceptable quality, and also they tend to clump together and unbalance the centrifuges used in their separation.

In an effort to recover caffein of acceptable purity from such aqueous extracts of coffee, various attempts have been made to remove the aforementioned impurities but none has heretofore been satisfactory from the practical standpoint. The use of adsorbents such as activated charcoal, carbon, and the like fail to remove the contaminants to a sufficient extent while on the other hand a large amount of caffein is also adsorbed. Caffein losses by such adsorption may amount to as much as 10-14% of the weight of the adsorbent in the case of activated charcoal. Purification by repeated recrystallization of the caffein has not proved practical, since in this case also purification is effected at the expense of decreased caffein yield. Extraction of the caffein preferentially from its organic solvent solution by water or from its aqueous solution by an organic solvent does not effect any appreciable improvement from a practical standpoint, since as stated above the solubility characteristics of the impurities are very similar to those of caffein.

The extent of contamination of the caffein with the above impurities is increased when the initial aqueous extract is made from roasted coffee rather than green coffee, perhaps because of a larger amount of such water-soluble impurities in the roasted coffee as the result of roasting. Also, green coffee is usually processed in the form of whole beans whereas roasted coffee is usually ground preparatory to making the infusion with resulting increased surface exposure that may make the impurities more available for solution. In the latter event, even though the initial aqueous extract is extracted by an organic caffein solvent and the caffein then re-dissolved in water, the impurities in the final aqueous solution may amount to as much as 30% by weight of the caffein. When whole green beans are extracted, the amount of impurities in the crystalling solution may be as small as 9% by weight of the caffein, but nevertheless the crystallized product falls substantially short of U. S. P. standards.

An object of the invention is to obtain a high yield of caffein of a high degree of purity from aqueous extracts of coffee such as described above.

Another object is to crystallize caffein of a high degree of purity directly from its final aqueous solution obtained as described above, in spite of the presence of impurities in the solution.

Another object is to obtain a high yield of such pure caffein.

Another object is to crystallize the caffein in the form of white needle-shaped crystals.

A further object is to eliminate clumping of the caffein crystals and consequent unbalancing of the centrifuges used in separating the crystallized caffein from the remaining liquor.

A still further object is to accomplish the foregoing results in a simple, economical manner.

I have discovered that a high yield of caffein of a high degree of purity, and having the usual white, needle-shaped crystalline form, may be obtained by crystallization directly from aqueous solutions prepared in the manner described above, provided that the solution is first treated with an alkali base to raise its pH value to at least 7.0. Optimum results are obtained within the pH range of 7.0 to 9.0, although higher pH values can be used if desired. The following table illustrates the effect of pH on the purity of the crystallized caffein:

| pH of Solution | Per cent Caffein in Crystals |
|---|---|
| 4.2 | 91.1 |
| 4.9 | 93.2 |
| 6.1 | 93.2 |
| 7.8 | 98.0 |
| 11.7 | 97.0 |

Adjustment of the pH of the solution to about 7.8 is preferred.

The materials which may be employed in making the above pH adjustment include basic compounds such as oxides, hydroxides, carbonates, bicarbonates and the like of the alkali metals sodium, potassium, lithium, rubidium, and cesium, and also ammonium bases such as ammonium hydroxide. It is to be understood that the term "alkali base" used herein and in the appended claims includes any or all such materials.

The manner in which the pH adjustment effects the aforementioned improvements in the purity, color, and shape, of the caffein crystals is not definitely established. These improvements may be due in part to increased solubilization of the impurities which prevents them from co-precipitating with the caffein, since the impurities appear to be organic materials of an acidic character and hence the pH adjustment could be expected to convert them largely to their alkali salt. Usually such salts are considerably more soluble than the corresponding free organic acids. However, this simple explanation does not account for the existence of the aforesaid optimum range of pH values, since there would be no such optimum if the only effect of pH adjustment were to form alkali salts. Also, when the mother liquor from which the caffein crystals are separated is diluted and heated as explained hereinafter, the impurities precipitate whereas alkali salts would not be expected to precipitate under these conditions.

The invention will be more fully understood with the aid of the following description and the accompanying flowsheet of operations found particularly suitable for carrying out a process embodying the invention. It is to be understood, however, that the operations shown are by way of illustration only and are not to be construed as limiting the scope of the invention, reference being had for the latter purpose to the appended claims.

Ground roasted coffee is extracted with hot water in the extractor 1 and the resulting infusion at a temperature of about 170° F. introduced into the bottom of a liquid-liquid extraction column 2, a water-immiscible organic caffein solvent such as trichlorethylene being introduced at about the same temperature into the top of said column. Rates of flow of the organic solvent and the infusion are so regulated as to provide a ratio of about three volumes of the organic solvent to one volume of the infusion in the column. The decaffeinated infusion leaving the column near its top may be further treated in any suitable manner as by concentration and spray drying (not shown) to produce soluble decaffeinated coffee. In other cases, the aqueous coffee extract circulating through the column may be an extract of green coffee as disclosed in Patent No. 2,309,092, etc.

The trichlorethylene solution removed from column 2 at the bottom will usually contain 0.11–0.14% of caffein and 0.033–0.039% of impurities by weight and have a pH of about 4.2. The caffein (accompanied by impurities) is then redissolved in water in any suitable manner, as by liquid-liquid extraction, distilling off the organic solvent, etc. As shown, the bulk of the organic solvent is removed in evaporator 3 and recovered in a suitable condensing system (not shown). The concentrated solution then flows to steam still 4 where the remaining solvent is removed, the steam and solvent vapors also passing to the aforementioned condensing system. The resulting aqueous solution of caffein and impurities is then concentrated in a suitable concentrator 5 until its caffein content is about 30% by weight.

The concentrated aqueous solution flows from the concentrator 5 to a steam-jacketed mixing tank 6 where it is mixed with carbon that has been previously used in treating caffein crystallized at a subsequent point in the process as explained hereinafter. In tank 6 the solution is contacted with from 0.4 to 0.5 lb. of such carbon (on its original dry weight basis) per gallon of solution for a period of about one-half hour to remove a certain amount of dissolved impurities. The spent carbon is filtered from the solution in a filter press 7 where it also functions as a filter aid to remove small amounts of suspended, water-insoluble impurities. Following filtration, wash water is passed through the the filter press and combined with the filtrate.

The solution leaving the filter press flows into a water-cooled crystallizing tank 8 wherein its pH is adjusted to a value of 7.0 or above by the addition of one or more of the aforementioned alkali bases such as caustic soda or soda ash. From 0.02 to 0.03 lb. of soda ash per gallon of solution will usually suffice to increase the pH to about 7.8. Caffein crystals formed in the tank 8 are separated from the mother liquor and washed in a continuous centrifuge 9, the diluted mother liquor thus obtained being further processed as described hereinbelow. The crystallized caffein contains only about 2% of impurities, the exact amount depending on the manner in which the aforementioned mother liquor is processed, whereas without pH adjustment the minimum amount of impurities would be about 9%.

If desired, the caffein obtained from the centrifuge 9 can be further purified in a steam-jacketed mixing tank 10 where it is re-dissolved in enough water to provide an approximately 30% caffein solution and treated for a half-hour period with from 0.4 to 0.5 lb. of fresh carbon per gallon of solution. This carbon with its adsorbed impurities is separated from the solution and washed in a filter press 11, after which the carbon is removed to the mixing tank 6 as mentioned above. The filtered caffein solution and washings flow into a water-cooled crystallizing tank 12 wherein the caffein is re-crystallized, no further pH adjustment being required. The resulting caffein crystals are then separated and washed in a continuous centrifuge 13 and sent to dryer 14. The mother liquor and washings from the centrifuge are combined and conveyed back to concentrator 5, the amount of impurities in the mother liquor being low enough to permit such recycling without material effect in building up the concentration of impurities in the system.

The first mother liquor obtained from centrifuge 9 will contain not only impurities but also substantial quantities of caffein and hence may be further processed in any suitable manner to increase the yield of the process. For example, any of the following methods may be employed from time to time or in any desired combination.

The mother liquor may simply be returned from the centrifuge 9 to the concentrator 5 through the line 15. Although impurities are thus returned to the system, experience has shown that the recycled impurities unexpectedly precipitate in the concentrator 5 to a sufficient extent that this method of operation is possible. However, the system must be purged from time to time, and the increased amount of water that must be evaporated in the concentrator adds materially to the cost of the process.

The mother liquor from the centrifuge 9 may also be concentrated further and cooled to provide additional caffein crystal crops, although again at the additional expense required for such water removal. In connection with such further concentration, if the pH has been adjusted too high the elevated temperatures required for concentration may cause hydrolysis of the caffein. Accordingly, if the solution in the tank 8 is made somewhat strongly alkaline, it is preferable to add enough acid to the mother liquor from the centrifuge 9 to reduce its pH to a slight alkaline or neutral value before concentration.

The flow sheet shows one such recrystallization stage in which the mother liquor from the centrifuge 9 is conveyed to a concentrator 16 and further concentrated until it contains about 30% caffein, the concentrated mother liquor being then introduced into a water-cooled, crystallizing tank 17. The slurry of crystals and mother liquor passes to a continuously operating centrifuge 18 to separate the second crystal crop from the mother liquor, after which the mother liquor and the impurities contained therein are discarded. Such additional crops are considerably less pure than the first crop obtained from the centrifuge 9. They may be purified by recrystallization procedures, but at the expense of an added series of operations that is undesirable. On the other hand, they may simply be returned via the line 19 to the concentrator 5 and recycled through the system, whereby their purification is accomplished conveniently and at the same time the amount of water that must be removed in concentrator 5 to provide a concentrated caffein solution for crystallization is reduced. However, the latter procedure has the disadvantage of recycling some impurities through the system.

A third method for handling the mother liquor from the centrifuge 9 is to separate the caffein from the bulk of the impurities and then to recycle the separated caffein through the system. This procedure is preferred because evaporation costs can be kept at a minimum and because impurities do not build up appreciably in the system while the total caffein crop is obtained in pure form at the centrifuge 13. Separation cannot be effected by liquid-liquid extraction of the mother liquor with an organic caffein solvent because stable emulsions are formed which prevent the essential separation of the aqueous and organic layers. However, I have found that the bulk of the impurities may be removed from the mother liquor by adjusting its pH to a value of 6.0 or less by the addition of any suitable acid, mineral acids such as $H_2SO_4$, $HCl$, $H_2SO_3$, $H_3PO_4$ and the like being preferred although any other acid of sufficient strength to reduce the pH to the required value may be employed. The impurities begin to precipitate as the pH is reduced below 6.0 and are largely precipitated at a pH of about 5.0 and almost completely precipitated at a pH of about 4.0. After the precipitated impurities are filtered off, the remaining mother liquor may be recycled through the system as stated above.

The foregoing operations are also illustrated in the flow sheet. The mother liquor from the centrifuge 9 flows into a mixing tank 20 where it is acidified to a pH of about 4.0 by the gradual addition of about 0.9 lb. of concentrated sulfuric acid (98%) per gallon of such liquor. After agitation for a suitable length of time to insure precipitation of the maximum amount of the impurities, the suspension is passed through a filter press 21 to remove the insoluble impurities, the precipitate being preferably washed with water and the washings combined with the filtrate.

The combined filtrate and washings may be conveyed directly to concentrator 5 via the line 22 and thus recycled through the system. Preferably, however, the combined filtrate and washings from filter press 21 are extracted with a water-immiscible, organic caffein solvent, being first heated to about 130° F. in a heater 23 and then supplied to the bottom of an extraction column 24 wherein they are extracted with at least three times their volume of fresh organic solvent introduced at about 120° F. into the top of the column. The spent mother liquor leaving the top of the column is discarded. The solvent is preferably the same solvent as that employed in column 2, and in this event the organic caffein solution leaving the bottom of the column 24 is recycled to the evaporator 3 together with the similar solution from the column 2. The ratio of impurities to caffein in the recycled solution from column 24 is about one-half the ratio of impurities to caffein in the solution from column 2.

The foregoing operations permit the recovery of U. S. P. caffein from aqueous coffee extracts with a high degree of recovery of the entering caffein. Prior to the present invention, the production of U. S. P. caffein from such extracts required complicated and extensive operations of carbon treatment and re-crystallization and the yield at best was only about 70% of the entering caffein. By crystallizing the caffein from an alkaline solution as described above a recovery of U. S. P. caffein equal to about 85% or more of the entering caffein is assured while the amount of carbon required is reduced to 50% or less. Still better results are obtained by suitable treatment of the mother liquor as described above and especially in the case of the preferred procedure of acidification and filtration thereof. When the acidified and filtered mother liquor passes through the line 22 directly to concentrator 5, the yield is about 92% and the amount of carbon is reduced to 25-33%, and when the mother liquor is passed through the liquid-liquid column 24 the yield is about 96% and the amount of carbon is further reduced to 12-20%.

The invention has been described above with particular reference to extracts of ground, roasted coffee, but it will be understood that processes embodying the invention may be applied as well to extracts of whole roasted beans, whole green beans, flaked green coffee, or the like. From the standpoint of decaffeination only, flaked green coffee is preferable in some respects. However, decaffeination is usually performed in conjunction with the production of a coffee beverage product, and in the case of green coffee decaffeination must be applied to whole green beans since flaked green coffee cannot be roasted to develop the characteristic coffee aroma and flavor. In the case of roasted coffee, either whole roasted beans or ground roasted coffee may be decaffeinated, but extraction is more efficient in the latter case.

It will be further understood that the detailed procedures which have been described above may be modified in various ways without departing from the spirit of the invention, and accordingly reference should be had to the appended claims to determine its scope.

What is claimed is:

1. A process for recovering caffein from a solution obtained by aqueous extraction of coffee which comprises extracting the aqueous extract with a water-immiscible organic caffein solvent, redissolving the solute from said organic solvent solution in water, adjusting the pH of the resulting aqueous solution to a value of at least 7.0 by the addition of an alkali base, and crystallizing the caffein therefrom.

2. A process for recovering caffein from a solution obtained by aqueous extraction of coffee which comprises extracting the aqueous extract with a water-immiscible organic caffein solvent, redissolving the solute from said organic solvent solution in water, adjusting the pH of the resulting aqueous solution to a value of at least 7.0 by the addition of an alkali base, crystallizing and recovering the caffein therefrom, acidifying the mother liquor from said crystallization to a pH of less than 6.0, and separating the thus formed precipitate and recovering the caffein from the thus treated mother liquor.

3. A process for recovering caffein from a solution obtained by aqueous extraction of coffee which comprises extracting the aqueous extract with a water-immiscible organic caffein solvent, redissolving the solute from said organic solvent solution in water, adjusting the pH of the resulting aqueous solution to a value within the range of 7.0-9.0 by the addition of an alkali base, crystallizing and recovering the caffein therefrom, acidifying the mother liquor from said crystallization to a pH of less than 6.0, separating the thus formed precipitate, extracting the remaining mother liquor with a water-immiscible organic caffein solvent, and recycling the resulting organic solvent solution.

4. A process for recovering caffein from a solution obtained by aqueous extraction of coffee which comprises extracting the aqueous extract with a water-immiscible chlorinated hydrocarbon solvent for caffein, redissolving the solute from said organic solvent solution in water, adjusting the pH of the resulting aqueous solution to a value within the range of 7.0-9.0 by the addition of sodium hydroxide, crystallizing and recovering the caffein therefrom, acidifying the mother liquor from said crystallization to a pH of about 4.0, separating the thus formed precipitate, extracting the remaining mother liquor with a water-immiscible chlorinated hydrocarbon solvent for caffein, and recycling the resulting chlorinated hydrocarbon solution.

5. A process for recovering caffein from a solution obtained by aqueous extraction of coffee which comprises extracting the aqueous extract with a water-immiscible chlorinated hydrocarbon solvent for caffein, redissolving the solute from said organic solvent solution in water, adjusting the pH of the resulting aqueous solution to a value within the range of 7.0-9.0 by the addition of sodium carbonate, crystallizing and recovering the caffein therefrom, acidifying the mother liquor from said crystallization to a pH of about 4.0, separating the thus formed precipitate, extracting the remaining mother liquor with a water-immiscible chlorinated hydrocarbon solvent for caffein, and recycling the resulting chlorinated hydrocarbon solution.

6. A process for recovering caffein from a solution obtained by aqueous extraction of coffee which comprises extracting the aqueous extract with a water-immiscible chlorinated hydrocarbon solvent for caffein, redissolving the solute from said organic solvent solution in water, adjusting the pH of the resulting aqueous solution to a value within the range of 7.0–9.0 by the addition of potassium hydroxide, crystallizing and recovering the caffein therefrom, acidifying the mother liquor from said crystallization to a pH of about 4.0, separating the thus formed precipitate, extracting the remaining mother liquor with a water-immiscible chlorinated hydrocarbon solvent for caffein, and recycling the resulting chlorinated hydrocarbon solution.

7. A process for recovering caffein from a solution obtained by aqueous extraction of roasted coffee which comprises extracting the aqueous extraction with trichlorethylene, distilling off said trichlorethylene and dissolving the residue in water, adjusting the pH of the resulting aqueous solution to a value of about 7.8 by the addition of sodium hydroxide, crystallizing and recovering the caffein therefrom, acidifying the mother liquor from said crystallization to a pH of about 4.0 by the addition of concentrated sulfuric acid, separating the thus formed precipitate, extracting the remaining mother liquor with trichlorethylene, and recycling the resulting trichlorethylene solution.

8. A process for recovering caffein from a solution obtained by aqueous extraction of roasted coffee which comprises extracting the aqueous extract with trichlorethylene, distilling off said trichlorethylene and dissolving the residue in water, adjusting the pH of the resulting aqueous solution to a value of about 7.8 by the addition of sodium carbonate, crystallizing and recovering the caffein therefrom, acidifying the mother liquor from said crystallization to a pH of about 4.0 by the addition of concentrated sulfuric acid, separating the thus formed precipitate, extracting the remaining mother liquor with trichlorethylene, and recycling the resulting trichlorethylene solution.

9. A process for recovering caffein from a solution obtained by aqueous extraction roasted coffee which comprises extracting the aqueous extract with trichlorethylene, distilling off said trichlorethylene and dissolving the residue in water, adjusting the pH of the resulting aqueous solution to a value of about 7.8 by the addition of potassium hydroxide, crystallizing and recovering the caffein therefrom, acidifying the mother liquor from said crystallization to a pH of about 4.0 by the addition of concentrated sulfuric acid, separating the thus formed precipitate, extracting the remaining mother liquor with trichlorethylene, and recycling the resulting trichlorethylene solution.

ALBERT C. SHUMAN.

No references cited.